UNITED STATES PATENT OFFICE.

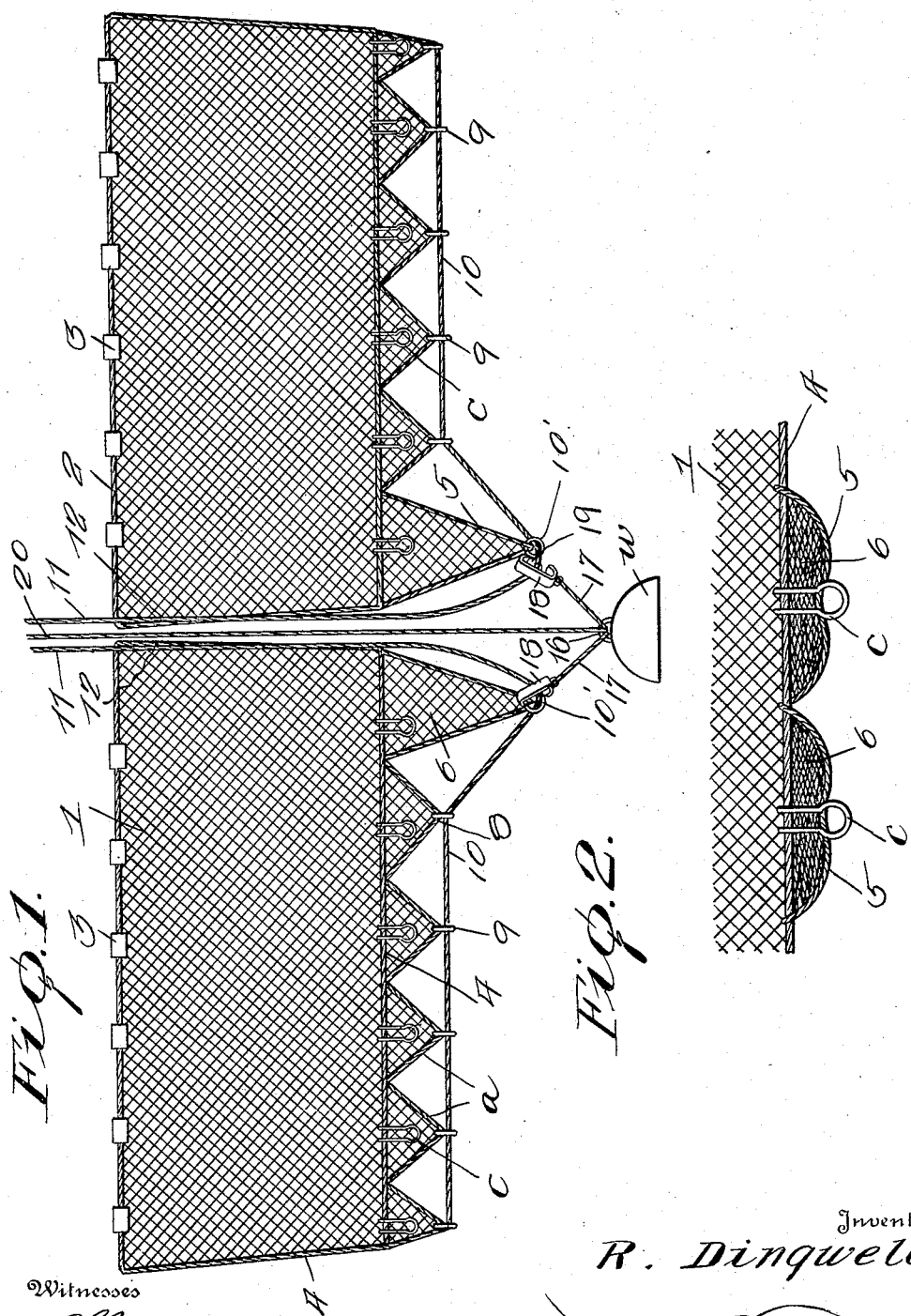

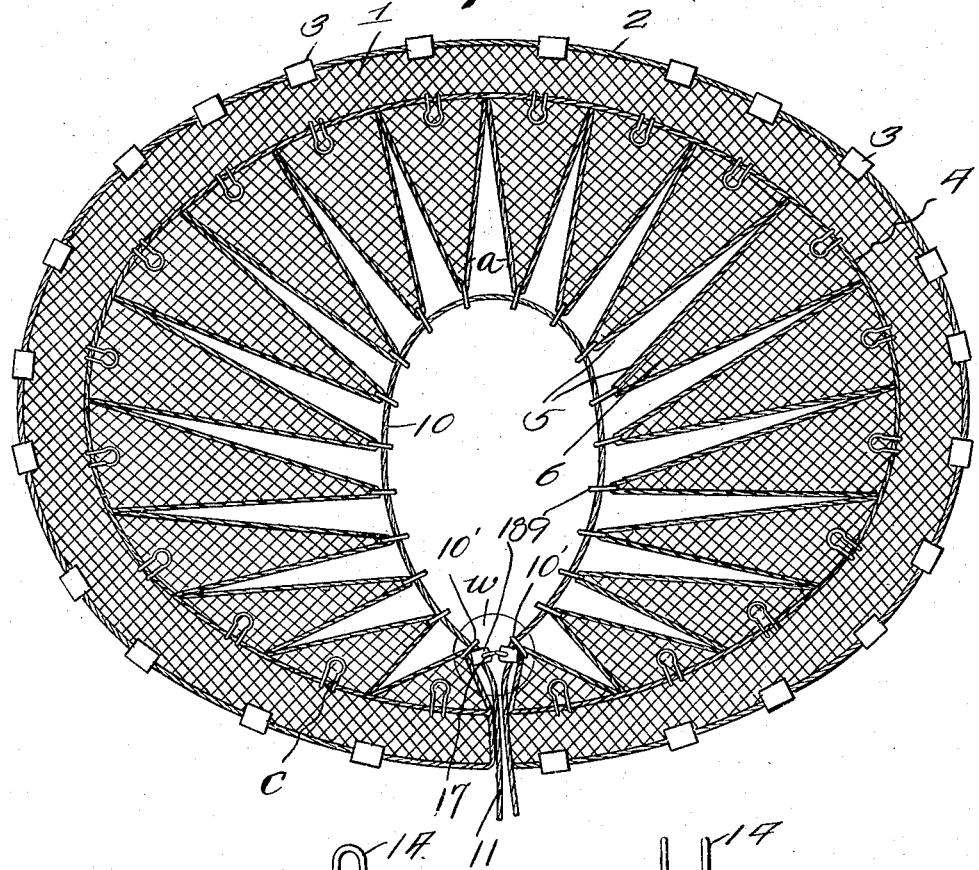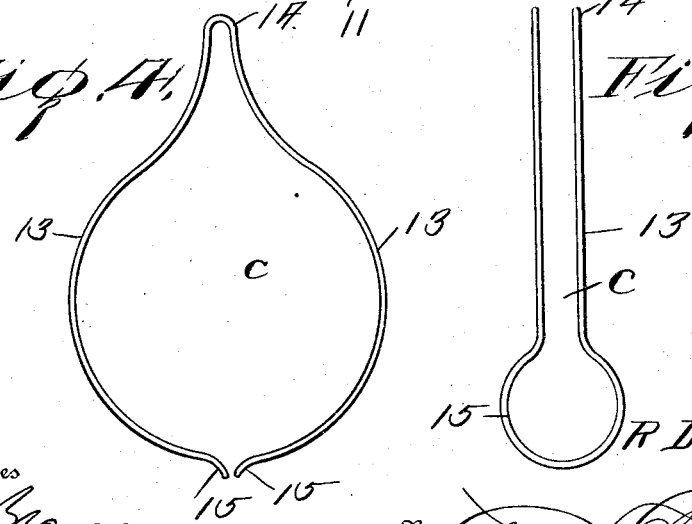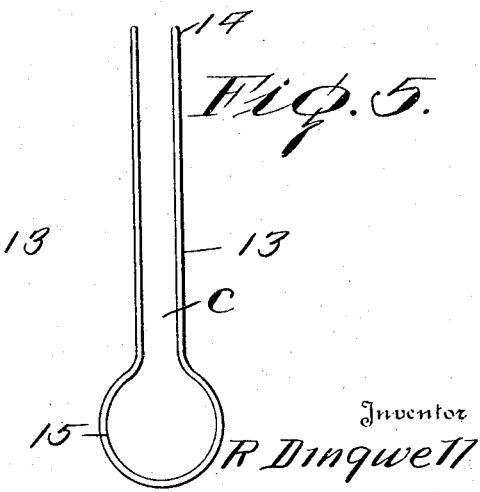

RUEL DINGWELL, OF CAMBRIDGEPORT, MASSACHUSETTS, ASSIGNOR OF ONE-THIRD TO JAMES A. CROMWELL AND ONE-THIRD TO F. W. JONES, BOTH OF BOSTON, MASSACHUSETTS.

FISHING-SEINE.

1,152,081.  Specification of Letters Patent.  Patented Aug. 31, 1915.

Application filed August 31, 1914. Serial No. 859,471.

*To all whom it may concern:*

Be it known that I, RUEL DINGWELL, a citizen of the United States, residing at Cambridgeport, in the county of Middlesex, State of Massachusetts, have invented certain new and useful Improvements in Fishing-Seines; and I do hereby declare the following to be a full, clear, and exact description of the invention, such as will enable others skilled in the art to which it appertains to make and use the same.

This invention relates to certain novel and useful improvements in fishing seines of the class known as purse seines.

The ordinary form of purse seine is composed of an upper section of netting having a rope extending along the top edge thereof and provided with corks, this rope being commonly known as the "cork rope," and a lower section of netting which is adapted to be pursed by the pursing rope. This lower portion of the seine is also formed of a continuous section or piece of netting, and is usually known as the pursing apron. In operating the ordinary form of net, the lower portion or pursing apron of the seine sinks down, and has to be hauled vertically through the water, thus involving the expenditure of considerable time and labor.

In carrying out my invention, instead of making the lower portion or apron of the seine of a continuous piece of netting, I provide a series of bridles or sections of netting, each including a rope bridle filled with and supporting the net webbing, these sections being adapted to be pursed by the pursing rope to inclose the bottom of the seine. By forming the lower portion of the seine of a series of triangular net sections, I am enabled to save considerable material or surplus twine, and at the same time the net may be manipulated or worked far more easily and with much less labor than the ordinary net. This will be apparent when it is considered that I dispense with considerable netting or material, or twine in constructing the seine and, therefore, have much less weight of material to handle in the pursing operation, and furthermore, in this pursing operation the triangular sections of netting, instead of dropping clear down in the water and thus requiring to be hauled vertically through the same, are pulled by the pursing line horizontally through the water, thereby decreasing the strain, labor and time necessary for the pursing operation.

It is also my purpose to provide a purse seine having a series of clamps which are preferably attached to the foot lines of the upper section or main portion of the seine, and are adapted to hold the triangular bridles at the time the seine is being set. When the purse line is drawn taut in the pursing operation, these triangular sections are released from their clamps and may be drawn to inclose the opening between the ends of the net and the bottom of the latter.

Another object is the provision of a pursing weight which is adapted to pull out the two bridles at the ends of the net and close the opening between such ends by bringing the ends together.

It is also my purpose to provide a purse seine which will embody the desired features of simplicity, efficiency and reliability and which may be manufactured and marketed at a relatively low cost.

With the above recited objects and others of a similar nature in view, my invention consists in the construction, combination and arrangement of parts set forth in and falling within the scope of the appended claims.

In the accompanying drawings: Figure 1 is a view in side elevation of a seine embodying my invention, showing the seine partly pursed. Fig. 2 is a view also in elevation of a portion of the seine and showing the triangular bridles or sections held by the clamps. Fig. 3 is a top plan view of the net showing the same partially pursed. Fig. 4 is an enlarged detail view in side elevation of one of the clamps. Fig. 5 is a view in end elevation of one of the clamps.

Referring now to the accompanying drawings in detail, the numeral 1 designates the upper portion of the seine which, as usual, is formed of a continuous piece of netting. The top edge of this net section is of the usual "cork rope" 2, having the corks 3 thereon. To the bottom edge of the end section 1 is fastened the usual foot rope 4. Connected with this foot rope 4 in any suitable manner are the triangular bridles or sections a composed of the rope bridles 5 which form, in conjunction with the foot rope to which they are attached, flexible triangular frames for the reception and support of the webs 6. These webs are formed of rope or twine netting, and each web completely fills the triangular rope bridle by which it is carried. It will be seen that the top portions of these triangular bridle sections a which form the pursing apron, are practically arranged end to end, while the lower ends or apices 8 of these triangular sections are, of course, spaced apart. The result is that when considered in connection with the ordinary form of pursing apron, I attain a great saving of net material, as I use in the construction of my bridle about one-half the material usually employed for this purpose. Suspended from the apex 8 of each twine bridle 5 is a pursing ring 9, while 10 is the pursing line or rope threaded through these rings, the tail ends 11 of the rope being adapted to be drawn upward or out through the pair of rings 10'—10' at the ends of that pair of bridles which lie adjacent the vertical meeting edges 12 of the net.

Secured to the foot rope are the clamps c, these clamps being preferably arranged one at approximately the center of each triangular bridle or section a. These clamps are designed to grip and hold the bridles a in folded position previous to the pursing operation. In Figs. 4 and 5 I have shown the construction of one of these clamps in detail. These clamps are preferably made of metal, such as bronze wire, steel spring wire, or the like, and each clamp embodies a pair of outwardly bowed or curved arms 13—13 merging at their upper ends into the approximately U-shaped connecting bight 14, which is adapted to fit over the foot rope. The lower ends of the arms 13—13 are widened to form the ring-like terminals 15 which abut against each other, these terminals being normally held in abutting or closed position by the resilient or spring action of the bowed arms 13. In the construction of the clamp it will be noted that when the adjacent bridle is rolled or folded it may be clamped or gripped between the arms 13—13 and will be prevented from falling out of the clamp by the gripping action of these arms, as well as by the fact that the widened terminals 15—15 of the arms contact.

The letter w indicates a pursing weight having a loop or eye 16 to which are connected the short sections of line 17—17, these lines being also attached to the blocks formed of the straps 18—18 carrying the rollers 19—19. The numeral 20 indicates the pursing weight line which is connected at one end to the weight and is adapted to be handled from the boat. This pursing weight is adapted to act in the usual manner, that is to insure tension or weight upon the line while being drawn taut in the pursing operation, so that in the present instance the triangular bridles a, forming the bottom of the net may be drawn toward the seine or pursed as shown in Fig. 3.

From the above description, taken in connection with the accompanying drawings, the construction and operation of my improved pursing seine will be readily apparent. The triangular twine bridles a are rolled up or folded and held by the clamps c as shown in Fig. 2 while the net is set. In setting the net the usual practice is followed and when the boat comes around and picks up the end of the net which was dropped at the start of the setting operation, the taut ends of the purse line are passed through the blocks connected with the weight and the blocks are dropped overboard so the weight will pull the two end bridles straight downward and toward each other to close the ends of the net and at the same time partially purse the other bridles. The tail ends of the lines are then pulled in the usual manner to purse the net and this results in pulling the twine bridles entirely out of or from the clamps, and the continued pull or tension on the pursing line draws these bridles horizontally through the water and inward toward the center of the net to close the bottom of the latter. By reference to Fig. 3, it will be seen that the net is shown as partially pursed and that the continued application of the pull to the tail ends of the pursing line would result in the net being completely closed.

It will be noted that I have provided a pursing seine which may be quickly and readily operated to close the bottom of the net beneath the fish, and furthermore, it will be seen that, dispensing as I do with considerable material in the manufacture of the net, I attain a considerable saving of expense in the cost of manufacture, in addition to providing a net which may be operated with less effort than the ordinary type of pursing seine.

While I have herein shown and described one particular embodiment of my invention, I wish it to be understood that I do not confine myself to all the precise details of construction herein set forth by way of illustration, as modification and variation may be made without departing from the spirit of the invention or exceeding the scope of the appended claims.

What I claim is:

1. In a pursing seine, a main net section, a series of net like bridles attached to the lower end of the main section, and constituting net sections adapted to be drawn together to form the bottom of the net, and a pursing rope loosely connected with the lower ends of the bridles for drawing the bridles together.

2. In a pursing seine, a main net section, a series of net-like bridles carried by the main section, and constituting net sections adapted to be drawn together to form the bottom of the net, a pursing line and a pursing weight adapted to draw the ends of the net and the bridles at such ends to close the space between such net ends, said weight partially pursing the remaining bridles.

3. In a pursing seine, a main net section, a series of net-like bridles attached to the lower end of the main section, and constituting net sections adapted to be drawn together to form the bottom of the net, pursing rope guides attached to the bridles and a pursing rope reeved through the guides.

4. In a pursing seine, a main net section having a foot rope at its lower end, a series of net like bridles attached to the foot rope and spaced apart at their lower ends, and constituting net sections adapted to be drawn together to form the bottom of the net, a pursing rope guide at the lower end of each bridle, and a pursing rope reeved through the guides.

5. In a pursing seine, a main net section, a series of clamps connected with the lower portion of the main net section, a series of net like bridles connected with the lower portion of the main section, and adapted to be folded and clamped by the clamps, a pursing rope guide carried by each bridle, and a pursing rope reeved through the guides and adapted to be drawn taut during the pursing operation to draw the bridles from their clamps and close the bottom of the seine with said bridles.

6. In a pursing seine, a main net section, having a foot rope at its lower end, a series of clamps carried by the foot rope, a series of substantially triangular bridles attached to the foot rope, each bridle being located adjacent one of the clamps, each section comprising a twine bridle and a net webbing, each bridle being adapted to be folded or held by the adjusting clamp prior to the pursing operation, a pursing rope guide carried by each bridle, and a pursing rope reeved through the guides and adapted when drawn taut to pull the bridles from the clamps and draw the same to close the bottom of the seine.

7. In a pursing seine, a main net section including a cork rope at the top edge thereof and a foot rope at the lower edge thereof, a series of substantially triangular net-like bridles attached to the foot rope, a pursing ring attached to the apex of each bridle, spring clips attached to the foot rope for holding the bridle in folded position, a pursing line loosely connected with the bridles and adapted when drawn taut to pull said bridles from their clamps and draw the same inward to close the bottom of the seine, and a pursing weight for the pursing line.

In testimony whereof, I affix my signature, in the presence of two witnesses.

RUEL DINGWELL.

Witnesses:
CHAS. H. PYNE,
ARTHUR B. LANE.

Copies of this patent may be obtained for five cents each, by addressing the "Commissioner of Patents, Washington, D. C."